US012716357B2

(12) United States Patent
Theratil et al.

(10) Patent No.: US 12,716,357 B2
(45) Date of Patent: Aug. 25, 2026

(54) MISTUNING ALTERNATE BLADES IN A GAS TURBINE ENGINE

(71) Applicant: Pratt & Whitney Canada Corp., Longueuil (CA)

(72) Inventors: Ignatius Theratil, Mississauga (CA); Krishna Prasad Balike, Brampton (CA); Ernest Adique, Brampton (CA); Anthony Bruni, Toronto (CA); Nicola Houle, Montreal (CA); Karan Anand, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/343,039

(22) Filed: Jun. 28, 2023

(65) Prior Publication Data

US 2025/0003339 A1 Jan. 2, 2025

(51) Int. Cl.

| | |
|---|---|
| ***F01D 5/10*** | (2006.01) |
| ***F01D 5/14*** | (2006.01) |
| ***F01D 5/16*** | (2006.01) |
| ***F01D 25/06*** | (2006.01) |

(52) U.S. Cl.

CPC ............... *F01D 5/10* (2013.01); *F01D 5/141* (2013.01); *F01D 5/16* (2013.01); *F01D 25/06* (2013.01); *F05D 2260/961* (2013.01)

(58) Field of Classification Search

CPC ... F01D 5/10; F01D 5/16; F01D 25/06; F05D 2260/961

See application file for complete search history.

(56) References Cited

U.S. PATENT DOCUMENTS

| | | | | |
|---|---|---|---|---|
| 5,540,551 | A | 7/1996 | Heinig | |
| 8,286,347 | B2 | 10/2012 | Dupeux et al. | |
| 10,865,806 | B2 | 12/2020 | Veitch et al. | |
| 2012/0312099 | A1* | 12/2012 | Russhard | G01H 1/003 73/660 |
| 2015/0110604 | A1 | 4/2015 | Calza et al. | |
| 2017/0175776 | A1 | 6/2017 | Theratil et al. | |
| 2018/0274558 | A1 | 9/2018 | Theratil et al. | |
| 2019/0085868 | A1* | 3/2019 | Anand | F04D 29/667 |
| 2020/0233991 | A1 | 7/2020 | Rose et al. | |

FOREIGN PATENT DOCUMENTS

| | | | |
|---|---|---|---|
| EP | 2805017 | B1 | 6/2016 |
| FR | 2944049 | A1 | 10/2010 |

OTHER PUBLICATIONS

European Search Report for EP Application No. 24185541.0 dated Nov. 19, 2024.

* cited by examiner

*Primary Examiner* — Scott J Walthour

(74) *Attorney, Agent, or Firm* — Carlson, Gaskey & Olds, P.C.

(57) ABSTRACT

A gas turbine engine includes a propulsor, a compressor section and a turbine section, at least one of the propulsor, compressor section and turbine section having at least one row of blades mounted in a rotor. There is a plurality of circumferentially spaced blades in the at least one row. The plurality of blades in the at least one row each having a platform with an airfoil extending radially outwardly of the platform. The airfoils in a first group of said plurality of rotating blades has a different shape than the airfoils in a second group of the plurality of blades.

3 Claims, 3 Drawing Sheets

MISTUNING ALTERNATE BLADES IN A GAS TURBINE ENGINE

BACKGROUND

This application relates to a method and apparatus of mistuning alternate blades in a blade row for a gas turbine engine.

Gas turbine engines are known, and typically have a fan section delivering air into a compressor. The air is compressed and delivered into a combustor. Productions of combustion pass downstream over turbine rotors, driving them to rotate. The fan, compressor and turbine sections all have rows of rotating blades. Typically the blades in any one row are all designed to have airfoils of the same shape and size.

Typically, a single blade shape will vibrate at a particular resonate frequency. Thus, if the blade row experiences a frequency that causes vibration, it will be multiplied across every blade in that blade row. It is desirable to avoid resonance vibrations in such components.

SUMMARY

A gas turbine engine includes a propulsor, a compressor section and a turbine section, at least one of the propulsor, compressor section and turbine section having at least one row of blades mounted in a rotor. There is a plurality of circumferentially spaced blades in the at least one row. The plurality of blades in the at least one row each having a platform with an airfoil extending radially outwardly of the platform. The airfoils in a first group of said plurality of rotating blades has a different shape than the airfoils in a second group of the plurality of blades.

These and other features will be best understood from the following drawings and specification, the following is a brief description.

DETAILED DESCRIPTION

Figure 1:
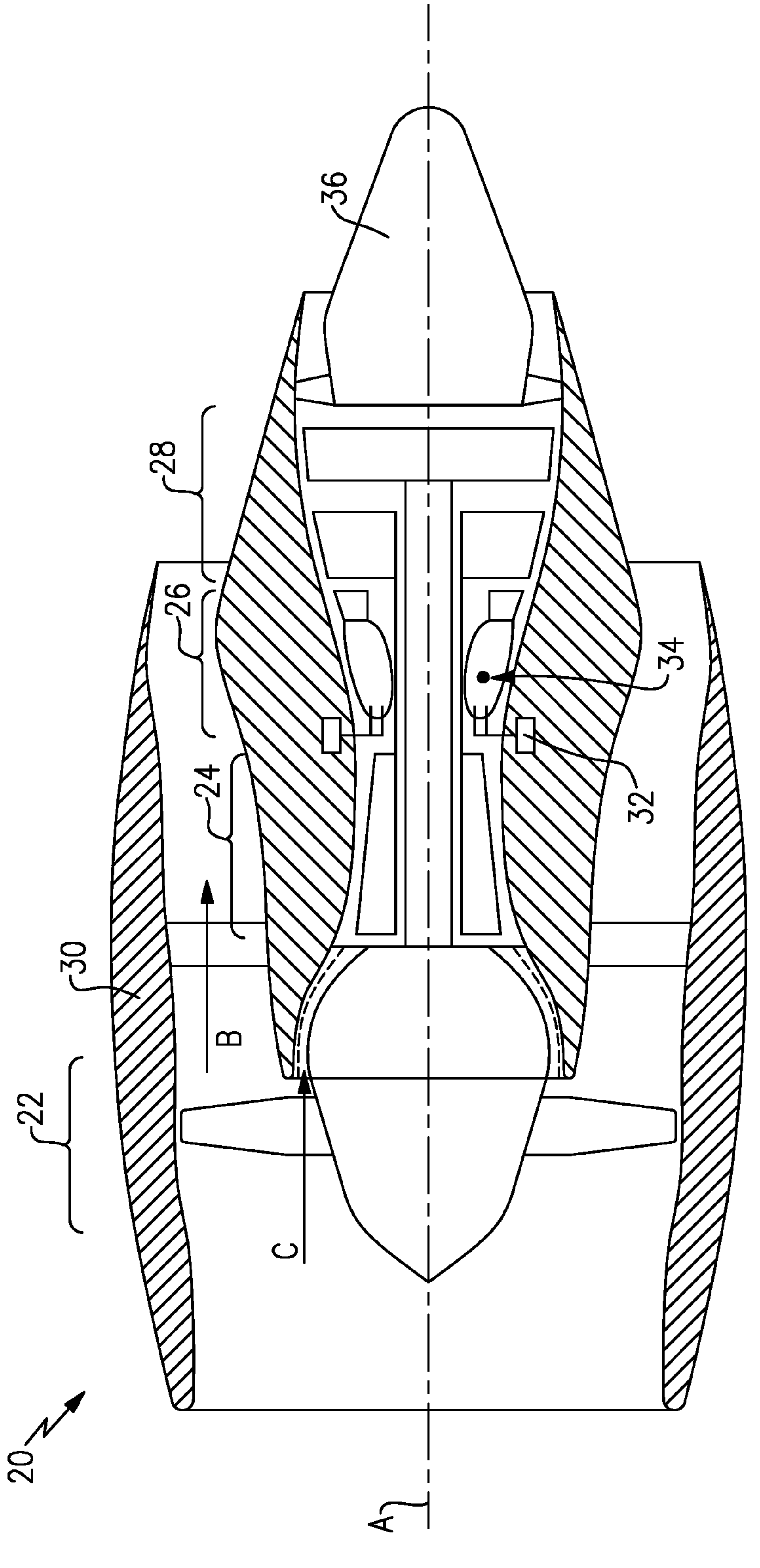
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. This embodiment can also be applied to industrial gas turbine engine as well.

Figure 2A:
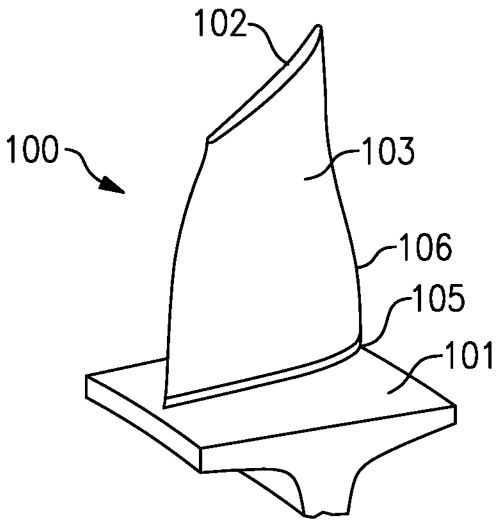
FIG. 2A shows a first rotating blade shape.

FIG. 2A shows a first blade that may be utilized in any of a fan, compressor or turbine section blade row. A blade 100 has an airfoil 103 extending from a platform 101 to a tip 102. The airfoil 103 merges into the platform 101 at point 105. A point 106 may be defined at 25% of a span between the point 105 to the tip 102. As shown in FIG. 2A, the airfoil 103 extends to be more straight through an area including point 106 than the blades shown in FIGS. 2B and 2C. The area radially inward of point 106 could be seen as a baseline shape.

Figure 2B:
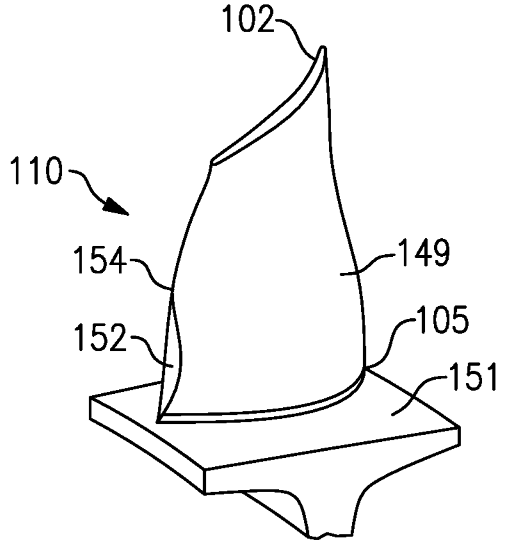
FIG. 2B shows an alternative rotating blade shape.

FIG. 2B shows an alternative blade 110. Blade 110 has an airfoil 149 extending from a point 105 at platform 151. A 25% span point 154 is illustrated. There is a point 152 within the 25% span wherein the airfoil 149 has been shifted tangentially relative to a baseline shape 106 as found in FIG. 2A. When the blades in a blade row are assembled, blades such as blade 100 and blade 110 are located to be alternating.

A worker of skill in this art would recognize that a resonant frequency will change between blades 100 and 110 due to the distinct shapes adjacent to the root or platform. Thus, the multiplier of all of the blades vibrating will be avoided.

However, since the mis-tuning or distinct shape is found in the first 25% of span, the radially outer portions, which perform much of the aerodynamic work of the blade, are not modified. That is, outwardly of the 25% span 106 and 154 the blades 100 and 110 are of an identical shape.

Figure 2C:
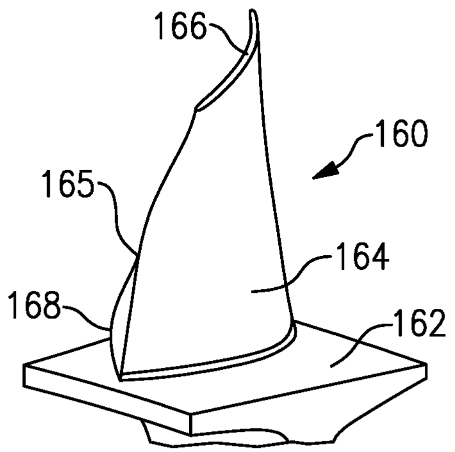
FIG. 2C shows another alternative rotating blade shape.

FIG. 2C shows an alternative blade 160. Here there is a platform 162 and a tip 166 and an airfoil 164 extending between the two. A 25% span point 165 defines the end of a portion 168 which is tangentially shifted relative to the baseline 106 of FIG. 2A in an opposed direction from the FIG. 2B shift.

Figure 3A:
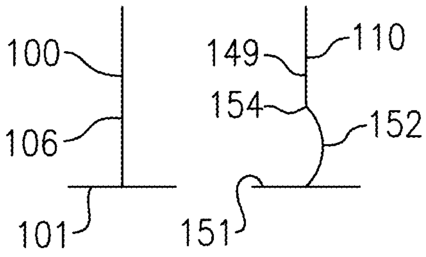
FIG. 3A shows one arrangement in a blade row.

FIG. 3A shows a blade row embodiment wherein the FIG. 2B blade 110 is utilized in combination with the FIG. 2A blade 100. The vibration response will be distinct between the blades 100 and 110 and the multiplier effect will be avoided. The tangential shifted portion 152 is within the first 25% of span. Outwardly of points 106 and 154 the airfoils are identical. While the shifted portion is disclosed within the first 25% span, rotor blades coming under this disclosure may have a tangentially shifted portion within the first 50% of the span.

Figure 3B:
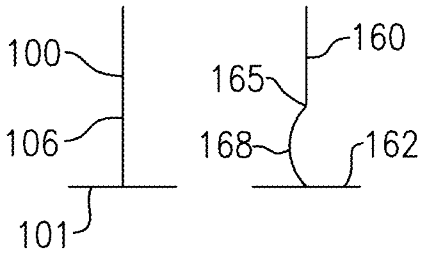
FIG. 3B shows an alternative arrangement in a blade row.

FIG. 3B shows a blade row embodiment wherein the FIG. 2C blade 160 is utilized in combination with the FIG. 2A blade 100. Here again, the vibration response will be distinct between the blades 100 and 160 and the multiplier effect will be avoided. Again, the tangential shifted portion 168 is in the first 25% span, and outwardly of points 106 and 165 the airfoils are identical. While the shifted portion is disclosed within the first 25% span, rotor blade coming under this disclosure may have their tangentially shaped portion within the first 50% of the span.

Figure 3C:
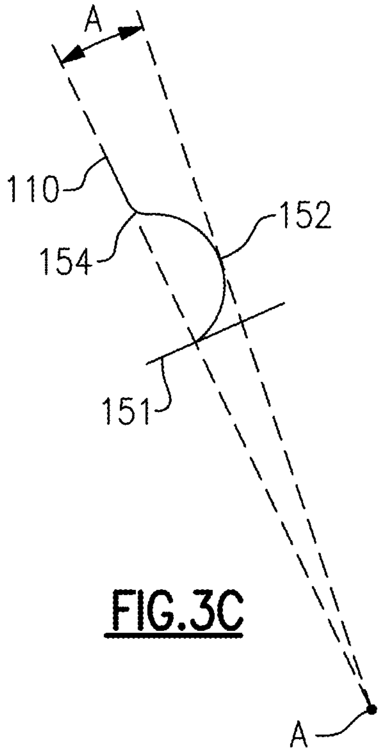
FIG. 3C shows a feature of the FIG. 3A or 3B blade row.

FIG. 3C shows another feature. The embodiment blade 110 is illustrated along with the 25% span point 154 and the platform 151. The most shifted part 152 is shown to be shifted relative to the shape of baseline airfoil 100 by an angle A relative to point A. Point A is a rotational axis, or center of the engine as shown in FIG. 1. In embodiments, the angle A is less than 2 degrees. In further embodiments, the angle A is less than 1 degree. In one embodiment, the angle A is 0.75 degrees.

It is also within the scope of this invention that the blades 110 and 160 can be utilized to alternative from each other, rather than the baseline blade 100. In such an embodiment the total tangential shift between the two blades may be above 1 degree.

Figure 4:
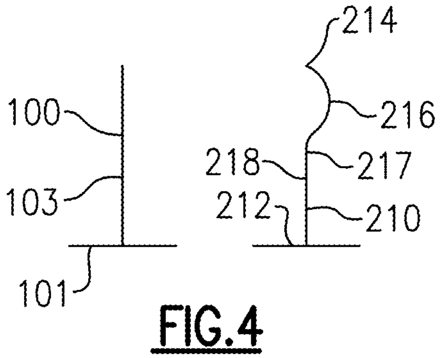
FIG. 4 shows an alternative blade row.

FIG. 4 shows an alternative embodiment having a baseline airfoil or blade 100 having an airfoil 103 extending from a platform 101. This is the baseline airfoil such as shown at 100.

The blades 100 are alternated with blades 210 having a platform 212, an airfoil 218 extending to top 214 and a tangentially shifted portion 216 outside the 50% span 217 of the overall airfoil 218.

This arrangement will operate in a similar manner to that described above, however, the airfoils will not be identical in this arrangement outside of the 50% span point.

A gas turbine engine under this disclosure could be said to include a propulsor 22, a compressor section 24 and a turbine section 26/28, at least one of the propulsor, compressor section and turbine section having at least one row of blades mounted in a rotor. There is a plurality of circumferentially spaced blades in the at least one row. The plurality of blades in the at least one row each having a platform with an airfoil extending radially outwardly of the platform. The airfoils in a first group of said plurality of rotating blades has a different shape than the airfoils in a second group of the plurality of blades.

In another embodiment according to the previous embodiment, a blade from the first group of blades circumferentially alternates with a blade from the second group of the plurality of blades.

In another embodiment according to any of the previous embodiments, the airfoils in the second group have a portion 152/168/216 that is tangentially shifted relative to the airfoil in the first group.

In another embodiment according to any of the previous embodiments, a span is defined along the airfoil between a root at the platform and a radially outer tip, and the tangentially shifted portion of the blades in the second group of the plurality of blades occurs within 50% of the span 154/165 from the root.

In another embodiment according to any of the previous embodiments, the tangentially shifted portion of the blades in the second group of the plurality of blades occurs within 25% of the span.

In another embodiment according to any of the previous embodiments, the airfoils in the first and second group of the plurality of blades are identical radially outwardly of the 25% span.

In another embodiment according to any of the previous embodiments, the tangential shift in the airfoil of the blades in the second group has a most shifted portion which is shifted less than 2 degrees from the corresponding portion in the airfoils in the first group of the plurality of blades.

In another embodiment according to any of the previous embodiments, the tangential shift in the airfoil of the blades in the second group has a most shifted portion which is shifted less than 1 degree from the corresponding portion in the airfoils in the first group of the plurality of blades.

In another embodiment according to any of the previous embodiments, the at least one rotating blade row is in the compressor section.

In another embodiment according to any of the previous embodiments, the at least one rotating blade row is in the turbine section.

In another embodiment according to any of the previous embodiments, the airfoils in the second group has a portion 152/168/216 that is tangentially shifted relative to the airfoil in the first group.

In another embodiment according to any of the previous embodiments, a span is defined along the airfoil between a root at the platform and a radially outer tip, and the tangentially shifted portion of the blades in the second group of the plurality of blades occurs within 50% of the span 154/165 from the root.

In another embodiment according to any of the previous embodiments, the tangentially shifted portion of the blades in the second group of the plurality of blades occurs within 25% of the span.

In another embodiment according to any of the previous embodiments, the airfoils in the first and second group of the plurality of blades are identical radially outwardly of the 25% span.

In another embodiment according to any of the previous embodiments, the tangential shift in the airfoil of the blades in the second group has a most shifted portion which is shifted less than 1 degree from the corresponding portion in the airfoil in the first group of the plurality of blades.

In another embodiment according to any of the previous embodiments, a span is defined along the airfoil between a root at the platform and a radially outer tip, and the different shape of the blades in the second group of the plurality of blades occurs outwardly of 50% of the span 152/165 from the root.

In another embodiment according to any of the previous embodiments, the airfoils in the first group is tangentially shifted in a first direction 152, and the airfoils in the second group are tangentially shifted in an opposed second direction 168.

In another embodiment according to any of the previous embodiments, the combined tangential shift between the airfoils in the first and second group is greater than 1 degree.

In another embodiment according to any of the previous embodiments, the at least one rotating blade row is in the compressor section.

In another embodiment according to any of the previous embodiments, the at least one rotating blade row is in the turbine section.

Although embodiments have been disclosed, a worker of skill in this art would recognize that modifications would come within the scope of this disclosure. For that reason, the following claims should be studied to determine the true scope and content.

What is claimed is:

1. A gas turbine engine comprising:

a propulsor, a compressor section and a turbine section, at least one of the propulsor, compressor section, and turbine section having at least one row of blades mounted in a rotor, there being a plurality of circumferentially spaced blades in the at least one row; and the plurality of blades in the at least one row each having a platform with an airfoil extending radially outwardly of the platform, the airfoils in a first group of said plurality of blades having a different shape than the airfoils in a second group of the plurality of blades;

wherein a tangentially shifted portion of the airfoils in the first group of the plurality of blades is shifted in a first direction and has a most shifted portion;

wherein a tangentially shifted portion of the airfoils in the second group of the plurality of blades is shifted in a second direction opposite the first direction and occurs within 25% of a span defined along the airfoils in the second group between a root at the platform and a radially outer tip; and wherein the blades in the first group and the second group of the plurality of airfoils are identical radially outwardly of the 25% span;

wherein the tangentially shifted portion of the airfoils in the second group has a most shifted portion which is shifted more than 1 degree and less than 2 degrees from the most shifted portion in the airfoils in the first group; and wherein an angle to define the most shifted portions of the first group and the second group is measured relative to a rotational axis of the gas turbine engine.

2. The gas turbine engine as set forth in claim 1, wherein the at least one row of blades is in the compressor section.

3. The gas turbine engine as set forth in claim 1, wherein the at least one rotating blade row is in the turbine section.

* * * * *